US010059569B2

(12) United States Patent
Fang et al.

(10) Patent No.: US 10,059,569 B2
(45) Date of Patent: Aug. 28, 2018

(54) MONITORING SYSTEM OF A PASSENGER CONVEYOR, A PASSENGER CONVEYOR, AND A MONITORING METHOD THEREOF

(71) Applicant: Otis Elevator Company, Farmington, CT (US)

(72) Inventors: Hui Fang, Shanghai (CN); Zhen Jia, Shanghai (CN); Yanzhi Chen, Shanghai (CN); Alan Matthew Finn, Hebron, CT (US); Arthur Hsu, South Glastonbury, CT (US); Jianwei Zhao, Shanghai (CN); ZhaoXia Hu, Hangzhou (CN); Qiang Li, Shanghai (CN); Anna Su, Shanghai (CN); Longwen Wang, Shanghai (CN); XuLei Guo, Shanghai (CN); Alois Senger, Gresten (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/660,194

(22) Filed: Jul. 26, 2017

(65) Prior Publication Data
US 2018/0029838 A1    Feb. 1, 2018

(30) Foreign Application Priority Data
Jul. 29, 2016  (CN) .......................... 2016 1 0610026

(51) Int. Cl.
*B66B 29/00*    (2006.01)
*B66B 5/00*     (2006.01)
(Continued)

(52) U.S. Cl.
CPC ............ *B66B 29/005* (2013.01); *B66B 21/02* (2013.01); *B66B 25/003* (2013.01); *B66B 29/08* (2013.01)

(58) Field of Classification Search
CPC ....... B66B 29/005; B66B 21/02; B66B 25/00; B66B 25/003; B66B 29/08
See application file for complete search history.

(56) References Cited

U.S. PATENT DOCUMENTS 6,334,522 B2 * 1/2002 Haruta .................... B66B 25/00
                                                    198/322
7,382,895 B2   6/2008 Bramblet et al.
(Continued)

FOREIGN PATENT DOCUMENTS

CN    101323411 A    12/2008
CN    101486432 A    7/2009
(Continued)

OTHER PUBLICATIONS

Abbate, Stefano, et al., "A smartphone-based fall detection system", Preprint submitted to Pervasive and Mobile Computing, Aug. 23, 2012, 25pgs.
(Continued)

*Primary Examiner* — Mark A Deuble
(74) *Attorney, Agent, or Firm* — Cantor Colburn LLP

(57) ABSTRACT

A monitoring system and a monitoring method for a passenger conveying device, and the passenger conveying device. The monitoring system comprises an imaging sensor and/or a depth sensing sensor for sensing a monitoring area of the passenger conveying device to acquire data frames; and a processing device for performing data processing on the data frames to monitor whether the monitoring area is abnormal, and configured to comprise: a background acquisition module for acquiring a background model based on data frames sensed when the monitoring area is in a normal state; a foreground detection module for comparing data frames sensed in real time with the background model to obtain a foreground object; a foreground feature extraction module for extracting a corresponding foreground object
(Continued)

markup feature from the foreground object; and a state judgment module for judging whether the foreground object belongs to an abnormal population.

24 Claims, 6 Drawing Sheets

(51) Int. Cl.
*B66B 21/02* (2006.01)
*B66B 25/00* (2006.01)
*B66B 29/08* (2006.01)

(56) References Cited

U.S. PATENT DOCUMENTS

| | | | |
|---|---|---|---|
| 7,831,087 B2 | 11/2010 | Harville | |
| 8,619,135 B2 * | 12/2013 | Shellshear | H04N 7/18 348/135 |
| 8,708,130 B2 | 4/2014 | De Coi et al. | |
| 9,815,664 B2 * | 11/2017 | Zhang | B66B 5/0012 |
| 2005/0088520 A1 | 4/2005 | Wiesinger et al. | |
| 2005/0232465 A1 | 10/2005 | Braune et al. | |
| 2012/0043180 A1 * | 2/2012 | Braasch | B66B 29/005 198/322 |
| 2013/0241730 A1 | 9/2013 | Saitwal et al. | |

FOREIGN PATENT DOCUMENTS

| | | |
|---|---|---|
| CN | 101665210 A | 3/2010 |
| CN | 101695983 A | 4/2010 |
| CN | 102476774 A | 5/2012 |
| CN | 103359600 A | 10/2013 |
| DE | 102012220702 A1 | 5/2014 |
| JP | 2002302373 A | 10/2002 |
| JP | 2003217086 A | 7/2003 |
| JP | 2011195288 A * | 10/2011 |
| JP | 2011195290 A * | 10/2011 |
| JP | 2014016742 A | 1/2014 |
| WO | 2009152766 A1 | 12/2009 |
| WO | 2015018435 A1 | 2/2015 |
| WO | 2015121751 A2 | 8/2015 |
| WO | 2015171774 A1 | 11/2015 |

OTHER PUBLICATIONS

Iter S.A. Health & Fitness, "Fade: Fall Detector" Google Play apps, 2016, 4pgs.

European Search Report for application EP 17184116.6, dated Jan. 3, 2018, 11 pages.

* cited by examiner

MONITORING SYSTEM OF A PASSENGER CONVEYOR, A PASSENGER CONVEYOR, AND A MONITORING METHOD THEREOF

PRIORITY

This application claims priority to Chinese Patent Application No. 201610610026.7, filed Jul. 29, 2016, and all the benefits accruing therefrom under 35 U.S.C. § 119, the contents of which in its entirety are herein incorporated by reference.

FIELD OF THE INVENTION

The present invention relates to the field of passenger conveying devices, and more specifically, the present invention relates to a monitoring system and a monitoring method for a passenger conveying device.

BACKGROUND OF THE INVENTION

As a tool for improving walking of passengers between floors or shortening walking distances of passengers, passenger conveying devices are very common in daily life. As an example, escalators which are usually used between commercial building floors and moving walks which are usually used for large airports are especially common.

For this type of tools, since an application scope and a population using the tools are very wide, various problems related to potential safety hazards inevitably and easily occur during use. Under one kind of situations, a part of the population, for example, unaccompanied old people, disabled people and the like, and for another example, ownerless pets or people carrying oversize articles, possibly cannot take passenger conveying devices for personal reasons. Under another kind of situations, some people who can take passenger the conveying devices are possibly in a state in which potential safety hazards may be caused in particular cases, e.g., when passengers suddenly fall down to the passenger conveying devices, some dangerous actions are made on the passenger conveying devices or the passenger conveying devices are too crowded since a passenger flow is large. If these behaviors can be better detected to eliminate potential safety hazards, the application of the passenger conveying devices can be further improved.

In addition, in a process of judging whether specific events related to potential safety hazards occur or are to occur on the passenger conveying devices, a great amount of redundant data need to be processed. If partial data can be screened out without influencing a judgment accuracy before these pieces of data are analyzed for judgment, the application of the passenger conveying devices will also be further improved.

Further, since people at present usually carry one or more wearable apparatuses with them, if these devices can be reasonably utilized to enable them to play a role of monitoring the passenger conveying devices, the application of the passenger conveying devices can also be further improved.

SUMMARY OF THE INVENTION

The purpose of the present invention is to provide some monitoring systems for passenger conveying devices, which can prevent or stop various types of safety problems from occurring in time.

The purpose of the present invention is further to provide some monitoring methods for passenger conveying devices, which can prevent or stop various types of safety problems from occurring in time.

The purpose of the present invention is further to provide a passenger conveying device, which can prevent or stop various types of safety problems from occurring in time.

According to one aspect of the present invention, the present invention provides a monitoring system for a passenger conveying device, comprising: an imaging sensor and/or a depth sensing sensor used for sensing a monitoring area of the passenger conveying device to acquire data frames; and a processing device used for performing data processing on the data frames to monitor whether the monitoring area is abnormal, and configured to comprise: a background acquisition module used for acquiring a background model based on data frames sensed when the monitoring area is in a normal state; a foreground detection module used for comparing data frames sensed in real time with the background model to obtain a foreground object; a foreground feature extraction module used for extracting a corresponding foreground object markup feature from the foreground object; and a state judgment module used for judging whether the foreground object belongs to an abnormal population at least based on the foreground object markup feature, and determining that the foreground object belongs to the abnormal population under a situation in which a judgment result is "yes".

According to another aspect of the present invention, the present invention further provides a monitoring method for a passenger conveying device, comprising: S100, a data frame acquisition step: sensing a monitoring area of the passenger conveying device to acquire data frames; S200, a background acquisition step: acquiring a background model based on data frames sensed when the monitoring area is in a normal state; S300, a foreground detection step: comparing data frames sensed in real time with the background model to obtain a foreground object; S400, a foreground feature extraction step: extracting a corresponding foreground object markup feature from the foreground object; and S500, state judgment step: judging whether the foreground object belongs to an abnormal population at least based on the foreground object markup feature, and determining that the foreground object belongs to the abnormal population under a situation in which a judgment result is "yes".

According to another aspect of the present invention, the present invention further provides a monitoring system for a passenger conveying device, comprising: an imaging sensor and/or a depth sensing sensor used for sensing a monitoring area of the passenger conveying device to acquire data frames; and a processing device used for performing data processing on the data frames to monitor whether the monitoring area is abnormal, and configured to comprise: a background acquisition module used for acquiring a background model based on data frames sensed when the monitoring area is in a normal state; a foreground detection module used for comparing data frames sensed in real time with the background model to obtain a foreground object; a foreground feature extraction module used for extracting a corresponding foreground object state feature from the foreground object; and a state judgment module used for judging whether the foreground object is in an abnormal state at least based on the foreground object state feature, and determining that the foreground object is in the abnormal state under a situation in which a judgment result is "yes".

According to another aspect of the present invention, the present invention further provides a monitoring method for a passenger conveying device, comprising: S100, a data frame acquisition step: sensing a monitoring area of the passenger conveying device to acquire data frames; S200, a background acquisition step: acquiring a background model based on data frames sensed when the monitoring area is in a normal state; S300, a foreground detection step: comparing data frames sensed in real time with the background model to obtain a foreground object; S400, a foreground feature extraction step: extracting a corresponding foreground object state feature from the foreground object; and S500, a state judgment step: judging whether the foreground object is in an abnormal state at least based on the foreground object state feature, and determining that the foreground object is in the abnormal state under a situation in which a judgment result is "yes".

According to another aspect of the present invention, the present invention further provides a monitoring system for a passenger conveying device, comprising: an imaging sensor and/or a depth sensing sensor used for sensing a monitoring area of the passenger conveying device to acquire a first data frame; a receiving device used for receiving a second data frame from a wearable apparatus, the second data frame being acquired by sensing the wearable apparatus and a carrier of the wearable apparatus through a data sensor of the wearable apparatus; and a processing device used for performing analysis processing on the first data frame and the second data frame to monitor whether the running passenger conveying device and/or the carrier of the wearable apparatus are in a normal state.

According to another aspect of the present invention, the present invention further provides a monitoring method for a passenger conveying device, comprising: S100, a first data frame acquisition step: sensing a monitoring area of the passenger conveying device to acquire a first data frame; S200, a second data frame acquisition step: receiving a second data frame from a wearable apparatus, the second data frame being acquired by sensing the wearable apparatus and a carrier of the wearable apparatus through a data sensor of the wearable apparatus; and S300, a processing step: performing analysis processing on the first data frame and the second data frame to monitor whether the running passenger conveying device and/or the carrier of the wearable apparatus are in a normal state.

According to another aspect of the present invention, the present invention further provides a monitoring system for a passenger conveying device, comprising: a depth sensing sensor used for sensing a monitoring area of the passenger conveying device to acquire a first data frame; an auxiliary sensor group used for sensing the monitoring area of the passenger conveying device to acquire a second data frame group; a preprocessing device used for performing distribution processing of an occurrence probability of a specific event on data frames in the second data frame group to acquire a preprocessed second data frame group; and a processing device used for performing analysis processing on the first data frame and the preprocessed second data frame group to monitor whether a specific event occurs on the running passenger conveying device.

According to another aspect of the present invention, the present invention further provides a monitoring method for a passenger conveying device, comprising: S100, a first data frame acquisition step: sensing a monitoring area of the passenger conveying device to acquire a first data frame; S200, a second data frame group acquisition step: sensing the monitoring area of the passenger conveying device to acquire a second data frame group; S300, a preprocessing step: performing distribution processing of an occurrence probability of a specific event on data frames in the second data frame group to acquire a preprocessed second data frame group; and S400, a state judgment step: performing analysis processing on the first data frame and the preprocessed second data frame group to monitor whether a specific event occurs on the running passenger conveying device.

According to another aspect of the present invention, the present invention further provides a passenger conveying device, comprising the monitoring system as described above.

DESCRIPTION OF THE EMBODIMENTS

Figure 1:
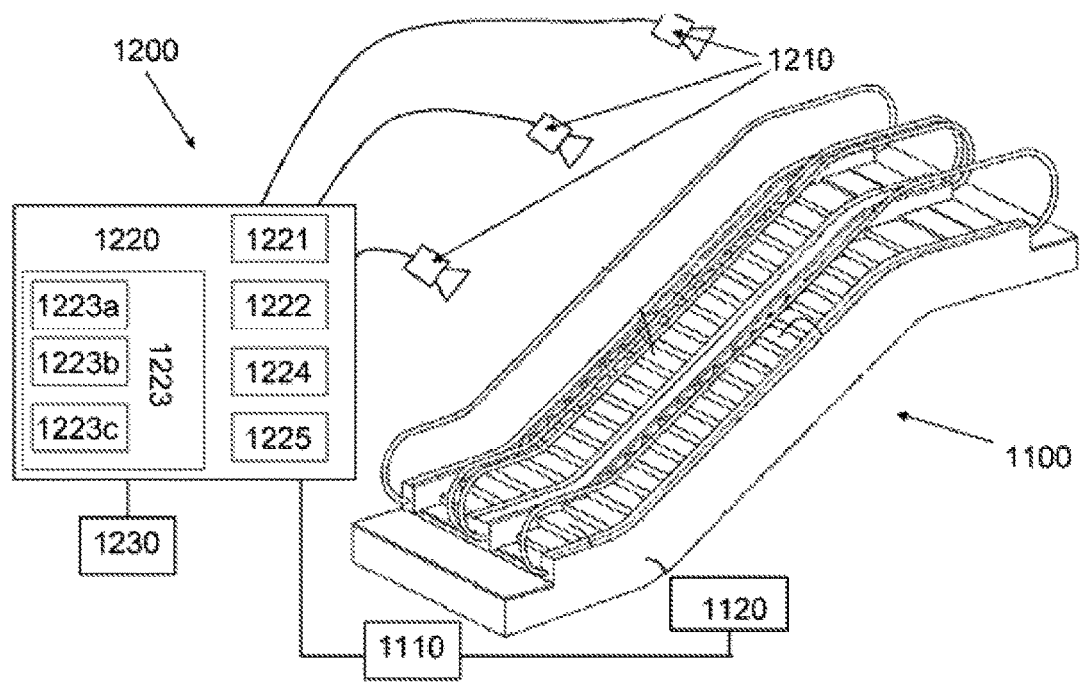
FIG. 1 is a schematic view according to one embodiment of a passenger conveying device and a monitoring system for the passenger conveying device provided by the present invention.

Now, the present invention will be more completely described with reference to the drawings. Exemplary embodiments of the present invention are illustrated in the drawings. However, the present invention may be implemented in many different modes and shall not be understood as being limited to the embodiments described herein. Contrarily, these embodiments are provided to enable the present disclosure to become thorough and complete and to fully transfer the concept of the present invention to one skilled in the art. In the drawings, the same reference signs refer to the same elements or components and thus descriptions about them are omitted.

Some block diagrams illustrated in the drawings are functional entities and do not necessarily correspond to physically or logically independent entities. These functional entities may be implemented in the form of software, or these functional entities may be implemented in one or more hardware modules or integrated circuits, or these functional entities may be implemented in different processing devices and/or microcontroller devices.

In the present invention, the passenger conveying devices comprise Escalators and Moving walks. In the embodiments illustrated below, the monitoring systems and the monitoring methods for the passenger conveying devices provided by embodiments of the present invention will be described in detail by taking an escalator as an example. However, it should be understood that the monitoring systems and the monitoring methods for the escalators in the following embodiments can also be analogically applied to the moving walks, and improvements such as in applicability which are possibly needed can be learned by one skilled in the art under the teaching of the embodiments of the present invention.

Acquisition of various data frames in the present invention is implemented more or less depending on an imaging sensor and/or a depth sensing sensor, and the two types of adopted sensors will be further explained below.

As an illustrative example, the imaging sensor may be various types of 2D image sensors. It should be understood that any image sensor capable of photographing to acquire image frames containing pixel brightness information may be applied herein. Of course, image sensors capable of photographing to acquire image frames containing pixel brightness information and color information (such as RGB information) may also be applied herein.

The depth sensing sensor may be any one or a combination of 1D, 2D and 3D depth sensors. This sensor can be operated under optical, electromagnetic or acoustic spectrums capable of producing depth maps (also known as point clouds or occupancy grids) having corresponding sizes. Various depth sensing sensor techniques and devices include but are not limited to structural light measurement, phase shift measurement, time-of-flight measurement and stereo-triangulation devices, optical triangulation device plates, light field cameras, coded aperture cameras, computer imaging techniques, Simultaneous Localization And Mapping (SLAM), imaging radars, scanning LIDAR, flash LIDAR, passive infrared (PR) sensors and small Focal Plane Arrays (FPAs) or combinations comprising at least one of the foregoing. Different techniques may include active (transmit and receive signals) or passive (only receive signals) techniques and may be operated under bands of the electromagnetic or acoustic spectrums (such as visual and infrared and the like). Using depth sensing may provide specific advantages better than those of conventional 2D imaging, and using infrared sensing may provide specific benefits better than those of visible spectrum imaging. Alternatively or additionally, the sensor may be an infrared sensor having one or more pixel space resolutions, such as a passive infrared (PR) sensor or a small IR Focal Plane Array (FPA).

It should be noted that there are differences in quality and quantity in terms of extents of providing many advantages in depth sensing between the 2D imaging sensor (such as a conventional safety camera) and the 1D, 2D or 3D depth sensing sensor. During 2D imaging, reflection colors (a mixture of wavelengths) from a first object in each radial direction of an imager are captured. Then, a 2D image may comprise a combined spectrum of spectrum reflection coefficients of objects in source illumination and a scenario. The 2D image can only be approximately interpreted as a picture by personnel. In the 1D, 2D or 3D depth sensing sensor, there is no color (spectrum) information; and more exactly, a distance (depth or range) to a first reflection object in a radial direction (1D) or directions (2D and 3D) of the sensor is captured. 1D, 2D and 3D techniques may have intrinsic maximum detectable range limits and may have space resolutions relatively lower than those of typical 2D imagers. In the aspect of relative immunity to the problem of environmental illumination, as compared with the conventional 2D imaging, by using 1D, 2D or 3D depth sensing, improved operations, better separation of covered objects and better privacy protection can be advantageously provided. By using infrared sensing, specific benefits better than those of visible spectrum imaging can be obtained. For example, a 2D image cannot be converted into a depth map and a depth map cannot be converted into a 2D image (for example, artificial distribution of continuous colors or grey scales to continuous depths will enable people such as personnel to see the 2D image to roughly interpret the depth map, and it is not a conventional image).

Refer to FIG. 1, which illustrates a monitoring system 1200 for a passenger conveying device 1100. The monitoring system 1200 comprises an imaging sensor and/or a depth sensing sensor 1210 used for sensing a monitoring area of the passenger conveying device 1100 to acquire data frames. With respect to the working principle thereof, detailed descriptions are already provided above and thus repeated descriptions are omitted here. Besides, the monitoring system 1200 further comprises a processing device 1220 used for performing data processing on the data frames to monitor whether the monitoring area is abnormal. Thereby, the monitoring area of the passenger conveying device 1100 may be monitored in real time to provide necessary warning or maintenance, so as to eliminate potential safety hazards caused by the existence of various abnormal populations.

Specifically, the processing 1220 is configured to comprise: a background acquisition module 1221, a foreground detection module 1222, a foreground feature extraction module 1223 and a state judgment module 1224, wherein the background acquisition module 1221 is used for acquiring a background model based on data frames sensed when the monitoring area is in a normal state; the foreground detection module 1222 is used for comparing data frames sensed in real time with the background model to obtain a foreground object; the foreground feature extraction module 1223 is used for extracting a corresponding foreground object markup feature from the foreground object; and the state judgment module 1224 is used for judging whether the foreground object belongs to an abnormal population at least based on the foreground object markup feature, and determining that the foreground object belongs to the abnormal population under a situation in which a judgment result is "yes". In the processing device 1220, the background acquisition module 1221 provides the background model for a reference basis for comparison; the data frames sensed in real time and the background model are processed in the foreground detection module 1222, and then the foreground object which needs to be analyzed is further acquired; and then the foreground object markup feature which can assist in making a final judgment is extracted from the foreground object through the foreground feature extraction module 1223, and finally whether the foreground object belongs to the abnormal population is judged by the state judgment module 1224 at least based on the foreground object markup feature. Therefore, execution of a next step of warning or other operations is facilitated, the abnormal population is prevented from taking the passenger conveying device 1100 or the abnormal population who have already used the passenger conveying device 1100 are reminded to be more careful, and thereby the potential safety hazards which are possibly caused by the abnormal population are eliminated.

As used throughout this text, background learning may be implemented through the following modes. For example, modes such as a Gaussian Mixture Model, a Codebook Model, Principle Components Analysis and Robust PCA and the like are adopted. Foreground object detection may be implemented through the following modes. For example, modes such as an inter-frame difference, morphological operators such as erosion and dilation and the like, and temporal, spatial or temporal-spatial kernel convolution and the like are adopted for implementation. Extraction of features may include estimation of temporal, spatial or temporal-spatial gradients; and estimation of colors, depths and histograms and parameter models of any of these parameters (such as human body or animal bone models), etc. Judgment of a specific category to which a certain group of features belong may be implemented through a distance function. For example, the distance function may be p-norm distance (comprising box metric and Euclidean distance), eccentric Pearson correlation, etc. Alternatively, a judgement of a specific category to which a group of features belong may be made by means of probability, e.g., a method based on separate or joint Bayesian inference may be adopted.

The above-mentioned embodiment further has several improvements or variations and partial variations thereof will be selected and described below.

Alternatively, the foreground feature extraction module 1223 further comprises an abnormal human body model generation submodule 1223a used for defining an abnormal human body model based on human body non-self-learning modeling such as a bone map model and/or a binary map model and the like and/or human body self-learning modeling, wherein the bone map model and the binary map model are comparatively mature human body modeling techniques, and the abnormal human body model concerned in this embodiment may be generated herein by introducing the bone map model and the binary map model which are well-known in the prior art. Besides, the human body self-learning modeling updates the abnormal human body model in real time or at fixed time based on the continuous learning and improvement of the monitoring system 1200 during use or based on the continuous update of a shared database. For example, as one type of examples in actual applications, the abnormal human body model may cover old people, disabled people, people carrying oversize objects, etc.

As used throughout this text, this model can be learned from data through deep learning techniques. Such deep learning techniques include but are not limited to deep neural networks, convolutional neural networks, recursive neural networks, dictionary learning, Bag-of-visual-words techniques, etc. A self-learning ability may be implemented through reinforcement learning, inverse reinforcement learning, etc. Besides, a non-learning modeling technique may be applied to situations in which the parameter model (such as the bone model) is predefined as normal or abnormal and areas of a parameter space (such as improper positions of limbs) are predefined as normal or abnormal. Any of these techniques and models may be temporal, spatial or temporal-spatial.

Alternatively, the foreground object markup feature extracted by the foreground feature extraction module 1223 comprises one or more of a color, a size, a shape and a speed of a human body in the foreground object, and the state judgment module 1224 judges whether the foreground object belongs to the abnormal population based on the color and/or the size and/or the speed of the human body in the foreground object. Further, when the color and/or the size and/or the speed of the human body in the foreground object falls into the abnormal human body model, the state judgment module 1224 judges that the foreground object belongs to the abnormal population. One skilled in the art should know that, in actual applications, according to the teaching of the embodiments disclosed in this text, the foreground feature extraction module may further extract other foreground object markup features that are actually required, so as to realize the purpose in the contents disclosed in this text.

For example, as one type of examples in actual applications, when the color of a specific part (such as head) of the human body in the foreground object is grey or white, the human body in the foreground object may be an old person in the abnormal human body model. For another example, when the size in a vertical direction (such as height) of the human body in the foreground object is too small, the human body in the foreground object may be a rickety old person or a disabled person who has leg injuries in the abnormal human body model. For another example, when the size in a vertical or horizontal direction of the human body in the foreground object is too large, the human body in the foreground object may be a person carrying an oversize object. For another example, when the speed of the human body in the foreground object is too slow, the human body in the foreground object may be an old person, a disabled person, a person carrying an oversize object, or the like. Alternatively, by combining a plurality of foreground object markup features to perform data processing, the level of recognition accuracy can be further improved.

Alternatively, the foreground feature extraction module 1223 further comprises an abnormal object model generation submodule 1223b used for defining an abnormal object model based on object non-self-learning modeling and/or object self-learning modeling, wherein the object self-learning modeling updates the abnormal object model in real time or at fixed time based on the continuous learning and improvement of the monitoring system 1200 during use or based on the continuous update of a shared database. For example, as one type of examples in actual applications, the abnormal object model may cover objects with sizes which exceed sizes of objects that can be borne by the passenger conveying device 1100 or that can be allowed to pass, etc.

Alternatively, the foreground object markup feature extracted by the foreground feature extraction module 1223 further comprises a size and/or a shape of an object in the foreground object, and the state judgment module judges whether the foreground object belongs to the abnormal population based on the size and/or the shape of the object in the foreground object. Further, when the size and/or the shape of the object in the foreground object falls into the abnormal object model, the state judgment module 1224 judges that the foreground object belongs to the abnormal population.

For example, as one type of examples in actual applications, when the size of the object in the foreground object is too large or too long, the object in the foreground object possibly falls into the range of the abnormal object model. For another example, when the shape of the object in the foreground object is oversize, the object in the foreground object possibly falls into the range of the abnormal object model. Alternatively, by combining a plurality of foreground object markup features to perform data processing, the level of recognition accuracy can be further improved.

Further, when the foreground object belongs to the abnormal population, the foreground feature extraction module 1223 is further used for extracting a corresponding foreground object markup feature around the abnormal population from the foreground object; and the state judgment module 1224 is further used for judging whether the foreground object is in an abnormal state at least based on the corresponding foreground object markup feature around the abnormal population, and determining that the foreground object is in the abnormal state under a situation in which a judgment result is "yes". Under partial situations in actual applications, it is not enough to trigger a warning behavior by recognizing the abnormal population only. For example, when an old person is accompanied by a relative, a possibility that the old person is in danger on the passenger conveying device 1100 is comparatively small. Therefore, further analysis may be performed, the foreground object markup feature around the abnormal population is recognized and finally whether the abnormal population is in the abnormal state is judged.

For example, as one type of examples in actual applications, whether the old people or disabled people are accompanied by relatives is recognized based on the corresponding foreground object markup feature around the abnormal population; and if the old people or disabled people are not accompanied by relatives, the abnormal population is in the abnormal state.

Alternatively, the foreground feature extraction module 1223 further comprises a pet model generation submodule 1223c used for defining a pet model based on pet non-self-learning modeling and/or pet self-learning modeling, wherein the pet self-learning modeling updates the pet model in real time or at fixed time based on the continuous learning and improvement of the monitoring system 1200 during use or based on the continuous update of a shared database. For example, as one type of examples, the original pet model already includes common pets such as cats and dogs and the like. When pet pigs start to become popular in the market during a certain period, the pet pigs may also be automatically included into the pet model through the pet self-learning modeling at this time.

Alternatively, the foreground object markup feature extracted by the foreground feature extraction module 1223 comprises a shape and/or a size and/or a color of a pet in the foreground object, and the state judgment module 1224 judges whether the foreground object belongs to the abnormal population based on the shape and/or the size and/or the color of the pet in the foreground object. Further, when the size and/or the shape of the pet in the foreground object falls into the pet model, the state judgment module 1224 judges that the foreground object belongs to the abnormal population.

For example, as one type of examples in actual applications, when the size, the shape and the color of the object in the foreground object are all approximate to those of a certain pet (such as a cat), the object falls into the pet model.

Alternatively, in certain states, an accurate judgment cannot be made based on a single-frame image. For example, needed information may be obtained through processing possibly by solely performing analysis on a motion trend of the foreground object or performing analysis on the motion trend of the foreground object in combination with other features. At this time, the processing device 1220 may be further improved such that the processing device 1220 is configured to further comprise a trajectory generation module 1225 used for generating a change trajectory of the foreground object markup feature according to the foreground object markup feature respectively extracted by the foreground feature extraction module 1223 from the foreground object corresponding to a plurality of continuous data frames. Correspondingly, the state judgment module 1224 capable of performing analysis and making a judgment is further configured to pre-judge whether the foreground object will belong to the abnormal population based on the change trajectory of the foreground object markup feature, and determine that the foreground object will belong to the abnormal population under a situation in which a judgment result is "yes".

As used throughout this text, trajectory generation may be implemented based on a feature vector by adopting Bayesian estimation techniques. For example, modes such as Kalman Filter and Particle Filter and the like may be specifically adopted. In terms of feature vectors, this feature vector may comprise one or more of a predefined temporal, spatial or temporal-spatial feature.

For example, as one type of examples in actual applications, when a pet cat at an entrance/an exit of an escalator has already been recognized based on the acquired foreground object markup feature but a motion trajectory of the pet cat recognized by the trajectory generation module 1225 is getting far away from the entrance/the exit of the escalator, it can be judged that there is no risk that the pet cat walks onto the escalator in combination with the change trajectory of the pet cat at this time, and thus no corresponding warning needs to be given.

Besides, in order to enhance and improve various effects of the above-mentioned embodiment from all aspects, several improvements and variations based on the above-mentioned embodiment are further provided here.

Alternatively, the state judgment module 1224 is further configured to, when judgment results of at least two continuous data frames are that the foreground object belongs to the abnormal population, determine that the foreground object belongs to the abnormal population. By adopting this setting and by performing monitoring multiple times, it is judged that the foreground object belongs to the abnormal population only after the same judgment results are acquired. Thereby, the judgment accuracy is further improved and the misjudgment rate is reduced.

Alternatively, the imaging sensor and/or the depth sensing sensor 1210 senses and acquires data frames within a predetermined period at an interval of a predetermined period for the processing device 1220 to perform data processing. By adopting this setting, similar monitoring effects may also be realized to a certain extent through intermittent judgments. For example, during a nighttime period, since users who use the passenger conveying device 1100 are relatively fewer, low-frequency monitoring is adopted at this time such that not only can the monitoring cost be saved, but also similar detection and safety prevention effects can be substantially achieved.

Alternatively, since the imaging sensor and/or the depth sensing sensor 1210 obtains a more accurate sensing result in a certain area range, in order to improve the detection accuracy, there are a plurality of imaging sensors and/or depth sensing sensors 1210, which are disposed to be capable of covering an entrance and/or an exit and/or an entire length direction of the passenger conveying device 1100.

Alternatively, the monitoring system 1200 further comprises an alarm unit 1230 and the state judgment module 1224 triggers the alarm unit 1230 to work under a situation in which the foreground object is determined to belong to the abnormal population. Correspondingly, the processing device 1220 is further configured to, when the state judgment module 1224 determines that the foreground object belongs to the abnormal population, trigger outputting of a signal to the passenger conveying device 1100 and/or an escalator maintenance center of a building to prevent a safety accident from occurring.

Figure 5:
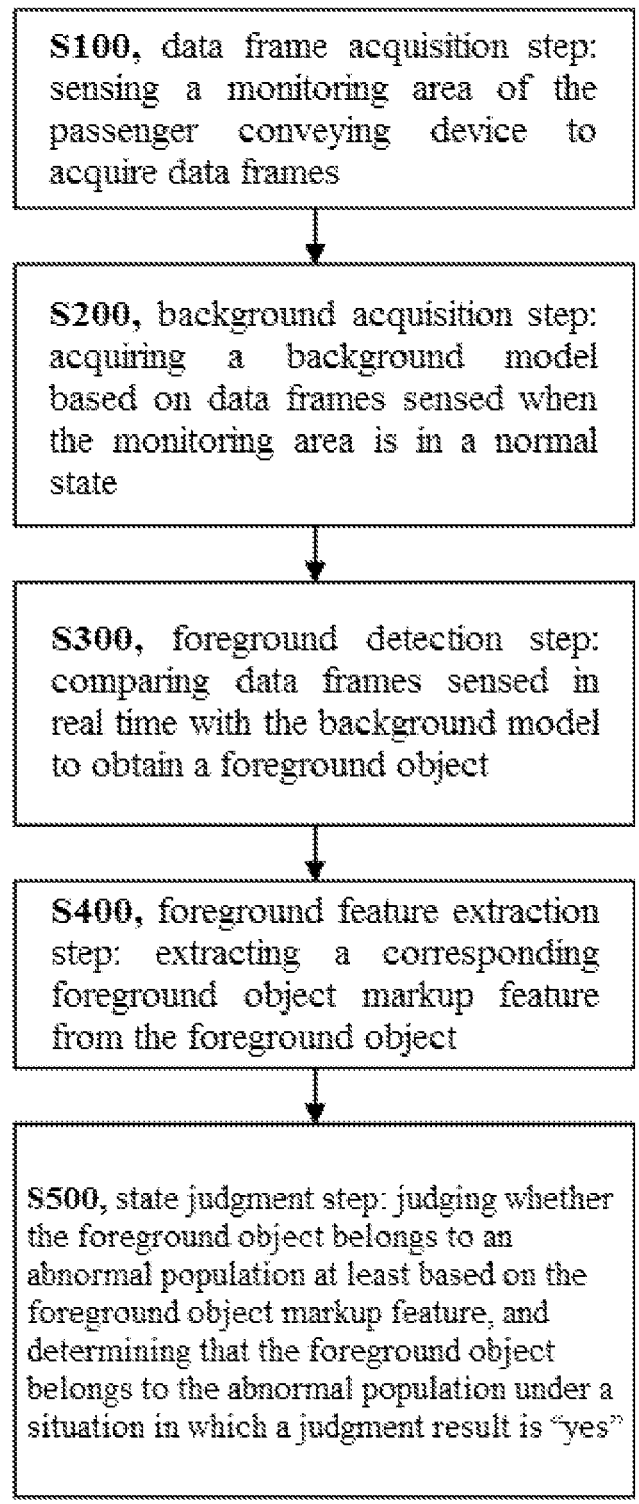
FIG. 5 is a schematic view of control steps according to one embodiment of a monitoring method for a moving handrail of a passenger conveying device provided by the present invention.

Referring to FIG. 5, a monitoring method for a passenger conveying device is further provided here to cooperate, in use, with the monitoring system recorded in the above-mentioned embodiment. The monitoring method comprises the following steps: S100, a data frame acquisition step: sensing a monitoring area of the passenger conveying device to acquire data frames; S200, a background acquisition step: acquiring a background model based on data frames sensed when the monitoring area is in a normal state; S300, a foreground detection step: comparing data frames sensed in real time with the background model to obtain a foreground object; S400, a foreground feature extraction step: extracting a corresponding foreground object markup feature from the foreground object; and S500, a state judgment step: judging whether the foreground object belongs to an abnormal population at least based on the foreground object markup feature, and determining that the foreground object belongs to the abnormal population under a situation in which a judgment result is "yes". This method can accurately recognize whether there is a situation in which the abnormal population is using or is to use the passenger conveying device in time, and feed the information back to the monitoring center or maintenance personnel, such that a response can be made in time and operations such as giving a warning, slowing down the speed of the device and even braking the device and the like can be performed according to actual situations.

Besides, in order to improve the practicability or accuracy of the monitoring method in the above-mentioned embodiment, several improvements or variations are further provided for each of the steps.

Alternatively, in order to facilitate the recognition of an abnormal human body, S400 further comprises S410, i.e., an abnormal human body model generation sub-step for defining an abnormal human body model based on a bone map model and/or a binary map model and/or human body self-learning modeling. As one type of examples in actual applications, the abnormal human body model may cover old people, disabled people, people carrying oversize objects, etc. This step is mainly used for providing a reference basis for subsequent comparison and judgment, so as to relatively simply recognize which objects belong to the concerned abnormal human body model.

Alternatively, in S410, the extracted foreground object markup feature comprises a color and/or a size and/or a speed of a human body in the foreground object; and in S500, whether the foreground object belongs to the abnormal population is judged based on the color and/or the size and/or the speed of the human body in the foreground object. Alternatively, when the color and/or the size and/or the speed of the human body in the foreground object falls into the abnormal human body model, it is judged that the foreground object belongs to the abnormal population. Here a specific judgment mode is provided, i.e., whether the foreground object belongs to the abnormal population is recognized based on some foreground object markup features which can highlight the human body in the foreground object, and these markup features may be colors and/or sizes and/or speeds, or other individual features or combined features. As one type of examples in actual applications, for example, when the color of a specific part (such as head) of the human body in the foreground object is grey or white, the human body in the foreground object may be an old person in the abnormal human body model. For another example, when the size in a vertical direction (such as height) of the human body in the foreground object is too small, the human body in the foreground object may be a rickety old person or a disabled person who has leg injuries in the abnormal human body model. For another example, when the size in a vertical or horizontal direction of the human body in the foreground object is too large, the human body in the foreground object may be a person carrying an oversize object. For another example, when the speed of the human body in the foreground object is too slow, the human body in the foreground object may be an old person, a disabled person, a person carrying an oversize object, or the like. Alternatively, by combining a plurality of foreground object markup features to perform data processing, the level of recognition accuracy can be further improved.

Alternatively, in order to facilitate the recognition of an abnormal object, S400 further comprises S420, i.e., an abnormal object model generation sub-step for defining an abnormal object model based on object non-self-learning modeling and/or object self-learning modeling. As one type of examples in actual applications, the abnormal object model may cover objects with sizes which exceed sizes of objects that can be borne by the passenger conveying device or that can be allowed to pass, etc. This step is mainly used for providing a reference basis for subsequent comparison and judgment, so as to relatively simply recognize which objects belong to the concerned abnormal object model.

Alternatively, in S420, the extracted foreground object markup feature further comprise a size and/or a shape of an object in the foreground object; and in S500, whether the foreground object belongs to the abnormal population is judged based on the size and/or the shape of the object in the foreground object. Further, when the size and/or the shape of the object in the foreground object falls into the abnormal object model, it is judged that the foreground object belongs to the abnormal population. Here a specific judgment mode is provided, i.e., whether the foreground object belongs to the abnormal population is recognized based on some foreground object markup features which can highlight the object in the foreground object, and these markup features may be sizes and/or shapes, or other individual features or combined features. As one type of examples in actual applications, for example, when the size of the object in the foreground object is too large or too long, the object in the foreground object possibly falls into the range of the abnormal object model. For another example, when the shape of the object in the foreground object is oversize, the object in the foreground object possibly falls into the range of the abnormal object model. Alternatively, by combining a plurality of foreground object markup features to perform data processing, the level of recognition accuracy can be further improved.

Further, when the foreground object belongs to the abnormal population, in S400, a corresponding foreground object markup feature around the abnormal population is further extracted from the foreground object; and correspondingly, in S500, whether the foreground object is in an abnormal state is further judged at least based on the corresponding foreground object markup feature around the abnormal population, and it is determined that the foreground object is in the abnormal state under a situation in which a judgment result is "yes". Under partial situations in actual applications, it is not enough to trigger a warning behavior by recognizing the abnormal population only. For example, when an old person is accompanied by a relative, a possibility that the old person is in danger on the passenger conveying device is comparatively small. Therefore, further analysis may be performed, the foreground object markup feature around the abnormal population is recognized and finally whether the abnormal population is in the abnormal state is judged.

For example, as one type of examples in actual applications, whether the old people or disabled people are accompanied by relatives is recognized based on the corresponding foreground object markup feature around the abnormal population; and if the old people or disabled people are not accompanied by relatives, the abnormal population is in the abnormal state.

Alternatively, S400 further comprises S430, i.e., a pet model generation sub-step for defining a pet model based on pet non-self-learning modeling and/or pet self-learning modeling. As one type of examples in actual applications, the pet model may cover various common pets in the market, etc. This step is mainly used for providing a reference basis for subsequent comparison and judgment, so as to relatively simply recognize which objects belong to the concerned pet model.

Alternatively, in S430, the extracted foreground object markup feature comprises a shape and/or a size and/or a color of a pet in the foreground object; and in S500, whether the foreground object belongs to the abnormal population is judged based on the shape and/or the size and/or the color of the pet in the foreground object. Further, when the size and/or the shape of the pet in the foreground object falls into the pet model, it is judged that that the foreground object belongs to the abnormal population.

For example, as one type of examples in actual applications, when the size, the shape and the color of the object in the foreground object are all approximate to those of a certain pet (such as a cat), the object falls into the pet model.

Alternatively, in certain states, an accurate judgment cannot be made based on a single-frame image. For example, needed information may be obtained through processing possibly by solely performing analysis on a motion trend of the foreground object or performing analysis on the motion trend of the foreground object in combination with other features. At this time, the processing device may be further improved such that the processing device further comprises a trajectory generation module. Correspondingly, S600 should also be added to the monitoring method, i.e., a trajectory generation step: generating a change trajectory of the foreground object markup feature according to the foreground object markup feature respectively extracted from the foreground object corresponding to a plurality of continuous data frames in S400. Correspondingly, in S500, whether the foreground object will belong to the abnormal population is pre-judged based on the change trajectory of the foreground object markup feature, and it is determined that the foreground object will belong to the abnormal population under a situation in which a judgment result is "yes".

For example, as one type of examples in actual applications, when a pet cat at an entrance/an exit of an escalator has already been recognized based on the acquired foreground object markup feature but a motion trajectory of the pet cat recognized by the trajectory generation module is getting far away from the entrance/the exit of the escalator, it can be judged that there is no risk that the pet cat walks onto the escalator in combination with the change trajectory of the pet cat at this time, and thus no corresponding warning needs to be given.

Besides, in order to enhance and improve various effects of the above-mentioned embodiment from all aspects, several improvements and variations based on the above-mentioned embodiment are further provided here.

Alternatively, in S500, when judgment results of at least two continuous data frames are that the foreground object belongs to the abnormal population, it is determined that the foreground object belongs to the abnormal population. By adopting this setting and by performing monitoring multiple times, it is judged that the foreground object belongs to the abnormal population only after the same judgment results are acquired. Thereby, the judgment accuracy is further improved and the misjudgment rate is reduced.

Alternatively, data frames are sensed and acquired within a predetermined period at an interval of a predetermined period for the processing device to perform data processing. By adopting this setting, similar monitoring effects may also be realized to a certain extent through intermittent judgments. For example, during a nighttime period, since users who use the passenger conveying device are relatively fewer, low-frequency monitoring is adopted at this time such that not only can the monitoring cost be saved, but also similar detection and safety prevention effects can be substantially achieved.

Alternatively, the monitoring method further comprises S700, i.e., an alarm step: triggering the alarm unit 1230 to work under a situation in which the foreground object is determined to belong to the abnormal population, so as to alert the monitoring center or maintenance personnel to make a response to eliminate potential safety hazards.

Figure 2:
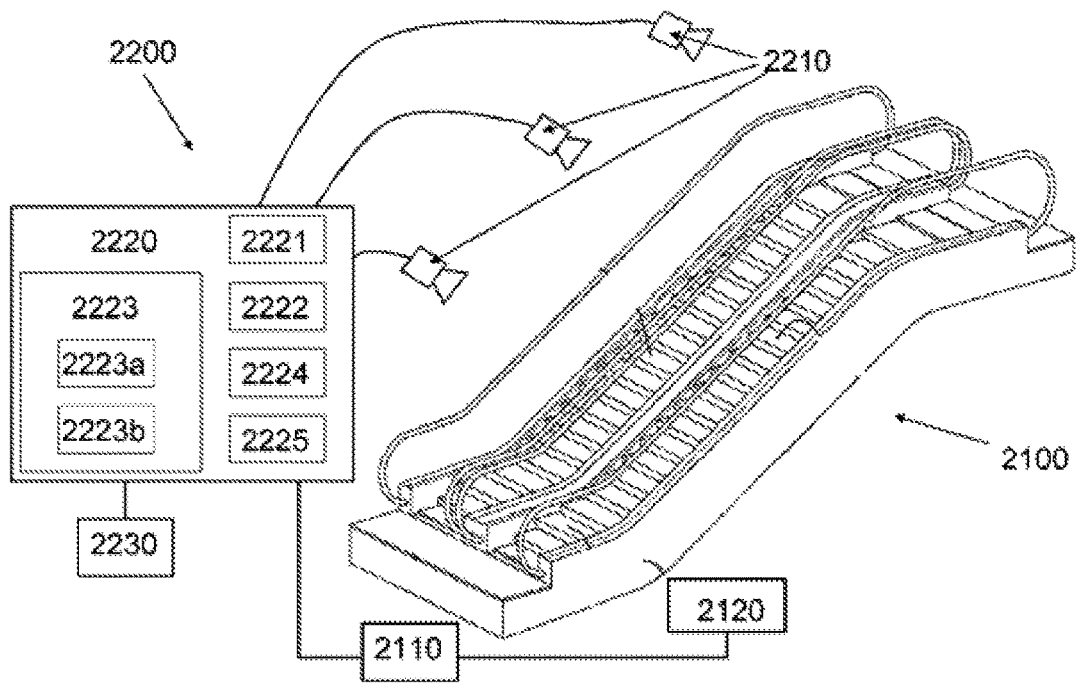
FIG. 2 is a schematic view according to another embodiment of a passenger conveying device and a monitoring system for the passenger conveying device provided by the present invention.

Refer to FIG. 2, which illustrates a monitoring system 2200 for a passenger conveying device 2100. The monitoring system 2200 comprises: an imaging sensor and/or a depth sensing sensor 2210 used for sensing a monitoring area of the passenger conveying device 2100 to acquire data frames; and a processing device 2220 used for performing data processing on the data frames to monitor whether the monitoring area is abnormal. Specifically, the processing device 2220 is configured to comprise: a background acquisition module 2221 used for acquiring a background model based on data frames sensed when the monitoring area is in a normal state; a foreground detection module 2222 used for comparing data frames sensed in real time with the background model to obtain a foreground object; a foreground feature extraction module 2223 used for extracting a corresponding foreground object state feature from the foreground object; and a state judgment module 2224 used for judging whether the foreground object is in an abnormal state at least based on the foreground object state feature, and determining that the foreground object is in the abnormal state under a situation in which a judgment result is "yes". In the processing device 2220, the background acquisition module 2221 provides the background model as a reference basis for comparison; the data frames sensed in real time and the background model are processed in the foreground detection module 2222, and then the foreground object which needs to be analyzed is further acquired; and then the foreground object state feature which can assist in making a final judgment is extracted from the foreground object through the foreground feature extraction module 2223, and finally whether the foreground object is in the abnormal state is judged by the state judgment module 2224 at least based on the foreground object state feature. Therefore, execution of a next step of warning or other operations is facilitated, the abnormal state which causes a potential safety hazard on the passenger conveying device 2100 is prevented or the objects that are already in the abnormal state are reminded to be more careful, and thereby the potential safety hazards which are possibly caused are eliminated.

The above-mentioned embodiment further has several improvements or variations and partial variations thereof will be selected and described below.

Alternatively, the foreground feature extraction module 2223 comprises a scenario model generation submodule 2223a used for defining a dangerous area based on the data frames sensed when the monitoring area of the passenger conveying device 2100 is in the normal state and/or a scenario self-learning model. As an example, this dangerous area may be designated in advance. For example, an installer or a user marks a specific physical area in an area presented on a computer. This dangerous area is a specific area in which a danger may occur under a daily situation on the passenger conveying device 2100, and may be changed according to actual situations. For example, in one example, an entrance of the passenger conveying device 2100 may be defined as a dangerous area by the sensed data frames and/or the scenario self-learning model, and at this time, if the density of population in this dangerous area is comparatively high, it indicates that problems such as crowded stampede and the like may occur.

Alternatively, the foreground object state feature extracted by the foreground feature extraction module 2223 comprises one or more of a speed, an acceleration, a target density and a position of the foreground object, and the state judgment module judges whether the foreground object is in the abnormal state based on one or more of the speed, the acceleration, the target density and the position of the foreground object. One skilled in the art should know that, in actual applications, according to the teaching of the embodiments disclosed in this text, the foreground feature extraction module may further extract other foreground object markup features that are actually required, so as to realize the purpose in the contents disclosed in this text. Further, when the speed of the foreground object in the extracted foreground object state feature exceeds a set speed threshold, the state judgment module judges that the foreground object is in the abnormal state; and/or when the acceleration of the foreground object in the extracted foreground object state feature exceeds a set acceleration threshold, the state judgment module judges that the foreground object is in the abnormal state; and/or when the target density of the foreground object in the extracted foreground object state feature exceeds a set target density threshold, the state judgment module judges that the foreground object is in the abnormal state.

For example, as one type of examples in actual applications, when the speed and/or the acceleration of the foreground object in the dangerous area is too large, it may be considered that there is a possibility of occurrence of a collision behavior at this moment, and thus it is judged that the foreground object is in the abnormal state. For another example, when the speed and/or the acceleration of the foreground object in the dangerous area is too small, it may be considered that there is a possibility of occurrence of crowding and stranding behaviors of people at this moment, and thus it is judged that the foreground object is in the abnormal state. For another example, when the target density of the foreground object in the dangerous area is too large, it may be considered that there is a possibility of crowing and stranding behaviors of people, and thus it is judged that the foreground object is in the abnormal state. Alternatively, by combining a plurality of foreground object markup features to perform data processing, the level of recognition accuracy can be further improved.

Alternatively, the foreground feature extraction module 2223 further comprises a human body abnormal action model generation submodule 2223b used for defining a human body abnormal action model based on a bone map model and/or a binary map model and/or human body self-learning modeling, wherein the bone map model and the binary map model are comparatively mature human body modeling techniques, and the human body abnormal action model concerned in this embodiment may be generated by introducing the bone map model and the binary map model which are well-known in the prior art. Besides, the human body self-learning modeling updates the human body abnormal action model in real time or at fixed time based on the continuous learning and improvement of the monitoring system 2200 during use or based on the continuous update of a shared database. For example, as one type of examples in actual applications, the human body abnormal action model may cover lie-down, double float, upward leg stretching, etc.

As used throughout this text, the human body action model can be learned from data through deep learning techniques. The deep learning techniques include but are not limited to deep neural networks, convolutional neural networks, recursive neural networks, dictionary learning, Bag of visual words techniques, etc. This model may also be established by using a Markov Model technique, Hidden Markov Models, Markov Decision Processes, Partially Observable Markov Decision Processes (MDPs), a Markov Decision Logic, and Probabilistic Programming, etc.

Alternatively, the foreground object state feature extracted by the foreground feature extraction module 2223 comprises an action of a human body in the foreground object, and the state judgment module judges whether the foreground object is in the abnormal state based on the action of the human body in the foreground object. Further, when the action of the human body in the foreground object falls into the human body abnormal action model, the state judgment module judges that the foreground object is in the abnormal state.

For example, as one type of examples in actual applications, when the human body in the foreground object makes an action of double float, this action should be considered as an action in the human body abnormal action model. For another example, when the human body in the foreground object makes an action of lie-down, this action should also be considered as an action in the human body abnormal action model.

Alternatively, under certain situations, it is not true that a potential safety hazard is caused when the actions in the human body abnormal action model are made in any area. A judgment is made further in combination with an actual place at which the human body is located. Under this variation, the foreground feature extraction module 2223 further comprises a scenario model generation submodule 2223a used for defining a dangerous area based on the data frames sensed when the monitoring area of the passenger conveying device 2100 is in the normal state and/or a scenario self-learning model. This dangerous area is a specific area in which a danger may be caused when a passenger makes this abnormal action on the passenger conveying device 2100, and may be changed according to actual situations. For example, in one example, when a passenger on a handrail side of the passenger conveying device 2100 stretches a leg out of a handrail, this leg stretching action may be considered as a human body abnormal action and the handrail side may be considered as a specific area.

Alternatively, the foreground object state feature extracted by the foreground feature extraction module 2223 comprises the position and the action of the human body in the foreground object, and the state judgment module judges whether the foreground object is in the abnormal state based on the position and the action of the human body in the foreground object. Further, when the position of the human body in the foreground object is in the dangerous area and the action of the human body in the foreground object falls into the human body abnormal action model, the state judgment module judges that the foreground object is in the abnormal state.

As one type of examples in actual applications, when the foreground object is in the dangerous area and makes an abnormal action which falls into the human body abnormal action model, the foreground object is considered to be in the abnormal state. For example, when the foreground object stretches a leg on the handrail side, the handrail side is a dangerous area, the leg stretching action is an abnormal action and thus it is judged that the foreground is in the abnormal state at this moment. For another example, when the foreground object falls down to a step, the step is a dangerous area, the falling-down action is an abnormal action and thus it is judged that the foreground is in the abnormal state at this moment. For another example, when the foreground object walks reversely on steps, the steps are a dangerous area, the reverse walking action is an abnormal action and thus it is judged that the foreground is in the abnormal state at this moment. Alternatively, by combining a plurality of foreground object markup features to perform data processing, the level of recognition accuracy can be further improved.

Alternatively, in certain states, an accurate judgment cannot be made based on a single-frame image. For example, needed information may be obtained through processing possibly by solely performing analysis on a motion trend of the foreground object or performing analysis on the motion trend of the foreground object in combination with other features. At this time, the processing device 2220 may be further improved. The processing device 2220 is configured to further comprise a trajectory generation module 2225 used for generating a change trajectory of the foreground object state feature according to the foreground object state feature respectively extracted by the foreground feature extraction module 2223 from the foreground object corresponding to a plurality of continuous data frames. Correspondingly, the state judgment module 2224 capable of performing analysis and making a judgment is further configured to pre-judge whether the foreground object will be in the abnormal state based on the change trajectory of the foreground object state feature, and determine that the foreground object will be in the abnormal state under a situation in which a judgment result is "yes".

More specifically, the foreground object state feature extracted by the foreground feature extraction module 2223 comprises the speed and/or the acceleration and/or the target density and/or the position of the foreground object, and the state judgment module judges whether the foreground object will be in the abnormal state based on the change trajectory of the speed and/or the acceleration and/or the target density of the foreground object in the dangerous area. Specifically, when the change trajectory of the speed of the foreground object within a preset period exceeds a set speed trajectory threshold, the state judgment module judges that the foreground object will be in the abnormal state; and/or when the change trajectory of the acceleration of the foreground object within a preset period exceeds a set acceleration trajectory threshold, the state judgment module judges that the foreground object will be in the abnormal state; and/or when the change trajectory of the target density of the foreground object within a preset period exceeds a set density trajectory threshold, the state judgment module judges that the foreground object will be in the abnormal state.

For example, as one type of examples in actual applications, when a great number of passengers gather at an entrance of the passenger conveying device 2100, but it is found that the passenger group is gradually scattered according to the change trajectory, i.e., although the target density at this position exceeds the set density threshold, the change trajectory of the target density does not exceed the set density trajectory threshold, it indicates that the congestion situation at this position possibly has already been greatly relieved, and thus it is not needed to continuously consider that the foreground object is in the abnormal state.

Alternatively, the foreground object state feature extracted by the foreground feature extraction module 2223 comprises the action of the human body in the foreground object, and the state judgment module judges whether the foreground object will be in the abnormal state based on the change trajectory of the action of the human body in the foreground object. Further, when the change trajectory of the action of the human body in the foreground object within the preset period exceeds a set action trajectory threshold, the state judgment module judges that the foreground object will be in the abnormal state.

For example, as one type of examples in actual applications, currently, when the human body in the foreground object falls down and then gets up by himself or herself, although this action has already been considered as an action in the human body abnormal action model, the motion trend of the action indicates that this problem has already been overcome and develops towards a better direction. Therefore, the change trajectory of the action does not exceed the set action trajectory threshold. At this time, it is not needed to consider that the foreground object is in the abnormal state.

Alternatively, under certain situations, it is not that a potential safety hazard is caused when the actions in the human body abnormal action model are made in any area. A judgment is made further in combination with an actual place at which the human body is located. Under this variation, the foreground object state feature extracted by the foreground feature extraction module 2223 further comprises the position of the human body in the foreground object, and the state judgment module judges whether the foreground object will be in the abnormal state based on the change trajectories of the position and the action of the human body in the foreground object. Specifically, when the change trajectory of the position of the human body in the foreground object within the preset period approaches the dangerous area and the change trajectory of the action of the human body in the foreground object within the preset period exceeds a set action trajectory threshold, the state judgment module judges that the foreground object will be in the abnormal state.

Alternatively, the state judgment module 2224 is further configured to, when judgment results of at least two continuous data frames are that the foreground object is in the abnormal state, determine that the foreground object is in the abnormal state. By adopting this setting and by performing monitoring multiple times, it is judged that the foreground object belongs to the abnormal population only after the same judgment results are acquired. Thereby, the judgment accuracy is further improved and the misjudgment rate is reduced.

Alternatively, the imaging sensor and/or the depth sensing sensor 2210 senses and acquires data frames within a predetermined period at an interval of a predetermined period for the processing device 2220 to perform data processing. By adopting this setting, similar monitoring effects may also be realized to a certain extent through intermittent judgments. For example, during a nighttime period, since users who use the passenger conveying device 2100 are relatively fewer, low-frequency monitoring is adopted at this time such that not only can the monitoring cost be saved, but also similar detection and safety prevention effects can be substantially achieved.

Alternatively, since the imaging sensor and/or the depth sensing sensor 2210 obtains a more accurate sensing result in a certain area range, in order to improve the level of detection accuracy, there are a plurality of imaging sensors and/or depth sensing sensors 2210, which are disposed to be capable of covering an entrance and/or an exit and/or an entire length direction of the passenger conveying device 2100.

Alternatively, the monitoring system 2200 further comprises an alarm unit 2230 and the state judgment module 2224 triggers the alarm unit 2230 to work under a situation in which the foreground object is determined to be in the abnormal state. Correspondingly, the processing device 2220 is further configured to, when the state judgment module 2224 determines that the foreground object is in the abnormal state, trigger outputting of a signal to the passenger conveying device 2100 and/or an escalator maintenance center of a building to prevent a safety accident from occurring.

Figure 6:
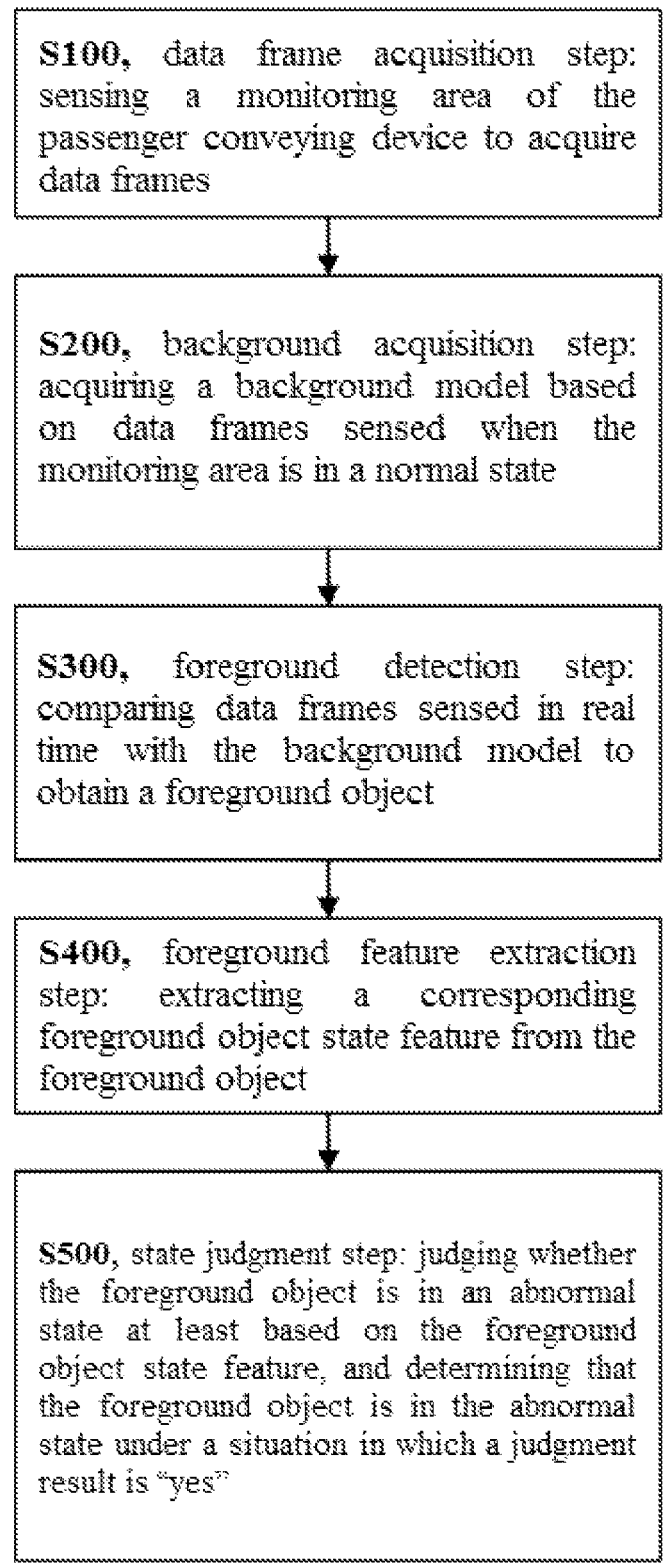
FIG. 6 is a schematic view of control steps according to another embodiment of a monitoring method for a moving handrail of a passenger conveying device provided by the present invention.

Referring to FIG. 6, a monitoring method for a passenger conveying device is further provided herein, so as to cooperate, in use, with the monitoring system recorded in the above-mentioned embodiment. The monitoring method comprises the following steps: S100, a data frame acquisition step: sensing a monitoring area of the passenger conveying device to acquire data frames; S200, a background acquisition step: acquiring a background model based on data frames sensed when the monitoring area is in a normal state; S300, a foreground detection step: comparing data frames sensed in real time with the background model to obtain a foreground object; S400, a foreground feature extraction step: extracting a corresponding foreground object state feature from the foreground object; and S500, a state judgment step: judging whether the foreground object is in an abnormal state at least based on the foreground object state feature, and determining that the foreground object is in the abnormal state under a situation in which a judgment result is "yes". This method can accurately recognize whether the population in the passenger conveying device is in the abnormal state in time, and feed the information back to the monitoring center or maintenance personnel, such that a response can be made in time and operations such as giving a warning, slowing down the speed of the device and even braking the device and the like can be performed according to actual situations.

Besides, in order to improve the practicability or accuracy of the monitoring method in the above-mentioned embodiment, several improvements or variations are further provided for each of the steps.

Alternatively, S400 further comprises S410, i.e., a scenario model generation sub-step for defining a dangerous area based on the data frames sensed when the monitoring area of the passenger conveying device is in the normal state and/or a scenario self-learning model. This dangerous area is a specific area in which a danger may occur under a daily situation on the passenger conveying device, and may be changed according to actual situations.

Alternatively, in S410, the extracted foreground object state feature comprises the speed and/or the acceleration and/or the target density of the foreground object, and in S500, whether the foreground object is in the abnormal state is judged based on the speed and/or the acceleration and/or the target density of the foreground object. Further, when the speed of the foreground object in the extracted foreground object state feature exceeds a set speed threshold, it is judged that the foreground object is in the abnormal state; and/or when the acceleration of the foreground object in the extracted foreground object state feature exceeds a set acceleration threshold, it is judged that the foreground object is in the abnormal state; and/or when the target density of the foreground object in the extracted foreground object state feature exceeds a set target density threshold, it is judged that the foreground object is in the abnormal state.

For example, as one type of examples in actual applications, when the speed and/or the acceleration of the foreground object in the dangerous area is too large, it may be considered that there is a possibility of occurrence of a collision behavior at this moment, and thus it is judged that the foreground object is in the abnormal state. For another example, when the speed and/or the acceleration of the foreground object in the dangerous area is too small, it may be considered that there is a possibility of occurrence of crowding and stranding behaviors of people at this moment, and thus it is judged that the foreground object is in the abnormal state. For another example, when the target density of the foreground object in the dangerous area is too large, it may be considered that there is a possibility of occurrence of crowding and stranding behaviors of people, and thus it is judged that the foreground object is in the abnormal state. Alternatively, by combining a plurality of foreground object markup features to perform data processing, the level of recognition accuracy can be further improved.

Alternatively, S400 further comprises S420, i.e., a human body abnormal action model generation sub-step used for defining a human body abnormal action model based on a bone map model and/or a binary map model and/or human body self-learning modeling, wherein the bone map model and the binary map model are comparatively mature human body modeling techniques, and the human body abnormal action model concerned in this embodiment may be generated by introducing the bone map model and the binary map model which are well-known in the prior art. Besides, the human body self-learning modeling updates the human body abnormal action model in real time or at fixed time based on the continuous learning and improvement of the monitoring system during use or based on the continuous update of a shared database. For example, as one type of examples in actual applications, the human body abnormal action model may cover lie-down, double float, upward leg stretching, etc.

Alternatively, in S420, the extracted foreground object state feature comprises an action of a human body in the foreground object; and in S500, whether the foreground object is in the abnormal state is judged based on the action of the human body in the foreground object. Further, when the action of the human body in the foreground object falls into the human body abnormal action model, it is judged that the foreground object is in the abnormal state.

For example, as one type of examples in actual applications, when the human body in the foreground object makes an action of double float, this action should be considered as an action in the human body abnormal action model. For another example, when the human body in the foreground object makes an action of lie-down, this action should also be considered as an action in the human body abnormal action model.

Alternatively, under certain situations, it is not that a potential safety hazard is caused when the actions in the human body abnormal action model are made in any area. A judgment is made further in combination with an actual place at which the human body is located. Under this variation, S400 in this monitoring method further comprises S430, i.e., a scenario model generation sub-step: defining a dangerous area based on the data frames sensed when the monitoring area of the passenger conveying device is in the normal state and/or a scenario self-learning model. This dangerous area is a specific area in which a danger may be caused when a passenger makes this abnormal action on the passenger conveying device, and may be changed according to actual situations. For example, in one example, when a passenger on a handrail side of the passenger conveying device stretches a leg out of a handrail, the leg stretching action may be considered as a human body abnormal action and the handrail side may be considered as a dangerous area.

Alternatively, in S430, the extracted foreground object state feature comprises the position and the action of the human body in the foreground object; and in S500, whether the foreground object is in the abnormal state is judged based on the position and the action of the human body in the foreground object. Further, when the position of the human body in the foreground object is in the dangerous area and the action of the human body in the foreground object falls into the human body abnormal action model, it is judged that the foreground object is in the abnormal state.

Alternatively, in certain states, an accurate judgment cannot be made based on a single-frame image. For example, needed information may be obtained through processing possibly by solely performing analysis on a motion trend of the foreground object or performing analysis on the motion trend of the foreground object in combination with other features. At this time, the processing device may be further improved. At this time, the corresponding monitoring method further comprises: S600, a trajectory generation step: generating a change trajectory of the foreground object state feature according to the foreground object state feature respectively extracted from the foreground object corresponding to a plurality of continuous data frames in S400. Correspondingly, in S500, whether the foreground object will be in the abnormal state is pre-judged based on the change trajectory of the foreground object state feature, and it is determined that the foreground object will be in the abnormal state under a situation in which a judgment result is "yes".

More specifically, in S400, the extracted foreground object state feature comprises the speed and/or the acceleration and/or the target density of the foreground object; and in S500, whether the foreground object will be in the abnormal state is judged based on the change trajectory of the speed and/or the acceleration and/or the target density of the foreground object in the dangerous area. Specifically, when the change trajectory of the speed of the foreground object within a preset period exceeds a set speed trajectory threshold, it is judged that the foreground object will be in the abnormal state; and/or when the change trajectory of the acceleration of the foreground object within a preset period exceeds a set acceleration trajectory threshold, it is judged that the foreground object will be in the abnormal state; and/or when the change trajectory of the target density of the foreground object within a preset period exceeds a set density trajectory threshold, it is judged that the foreground object will be in the abnormal state.

For example, as one type of examples in actual applications, when a great number of passengers gather at an entrance of the passenger conveying device, but it is found that the passenger group is gradually scattered according to the change trajectory, i.e., although the target density at this position exceeds the set density threshold, the change trajectory of the target density does not exceed the set density trajectory threshold, it indicates that the congestion situation at this position possibly has already been greatly relieved, and thus it is not needed to continuously consider that the foreground object is in the abnormal state.

Alternatively, in S400, the foreground object state feature extracted by the foreground feature extraction module comprises the action of the human body in the foreground object; and in S500, whether the foreground object will be in the abnormal state is judged based on the change trajectory of the action of the human body in the foreground object. Further, when the change trajectory of the action of the human body in the foreground object within the preset period exceeds a set action trajectory threshold, it is judged that the foreground object will be in the abnormal state.

For example, as one type of examples in actual applications, currently, when the human body in the foreground object falls down and then gets up by himself or herself, although this action has already been considered as an action in the human body abnormal action model, the motion trend of the action indicates that this problem has already been overcome and develops towards a better direction. Therefore, the change trajectory of the action does not exceed the set action trajectory threshold. At this time, it is not needed to consider that the foreground object is in the abnormal state.

Alternatively, under certain situations, it is not that a potential safety hazard is caused when the actions in the human body abnormal action model are made in any area. A judgment is made further in combination with an actual place at which the human body is located. Under this variation, in S400, the foreground object state feature extracted by the foreground feature extraction module further comprises the position of the human body in the foreground object; and in S500, whether the foreground object will be in the abnormal state is judged based on the change trajectories of the position and the action of the human body in the foreground object. Specifically, when the change trajectory of the position of the human body in the foreground object within the preset period approaches the dangerous area and the change trajectory of the action of the human body in the foreground object within the preset period exceeds a set action trajectory threshold, it is judged that the foreground object will be in the abnormal state.

Alternatively, in S500, when judgment results of at least two continuous data frames are that the foreground object is in the abnormal state, it is determined that the foreground object is in the abnormal state. By adopting this setting and by performing monitoring multiple times, it is judged that the foreground object belongs to the abnormal population only after the same judgment results are acquired. Thereby, the judgment accuracy is further improved and the misjudgment rate is reduced.

Alternatively, data frames within a predetermined period are sensed and acquired at an interval of a predetermined period for the processing device to perform data processing. By adopting this setting, similar monitoring effects may also be realized to a certain extent through intermittent judgments. For example, during a nighttime period, since users who use the passenger conveying device are relatively fewer, low-frequency monitoring is adopted at this time such that not only can the monitoring cost be saved, but also similar detection and safety prevention effects can be substantially achieved.

Alternatively, the monitoring method further comprises S700, i.e., an alarm step: triggering the alarm unit 1230 to work under a situation in which the foreground object is determined to be in the abnormal state, so as to prevent a safety accident from occurring.

Figure 3:
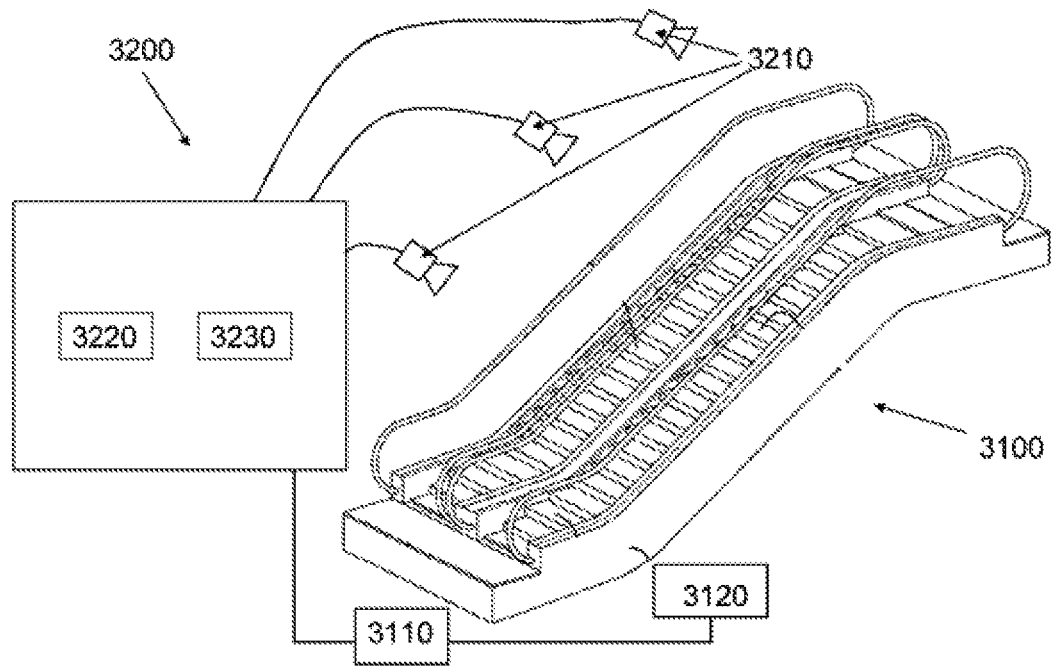
FIG. 3 is a schematic view according to another embodiment of a passenger conveying device and a monitoring system for the passenger conveying device provided by the present invention.

Referring to FIG. 3, an embodiment of another monitoring 3200 for a passenger conveying device 3100 is further provided. The monitoring system 3200 comprises: an imaging sensor and/or a depth sensing sensor 3210 used for sensing a monitoring area of the passenger conveying device 3100 to acquire a first data frame; a receiving device 3230 used for receiving a second data frame from a wearable apparatus, the second data frame being acquired by sensing the wearable apparatus and a carrier of the wearable apparatus through a data sensor of the wearable apparatus; and a processing device 3220 used for performing analysis processing on the first data frame and the second data frame to monitor whether the running passenger conveying device 3100 and/or the carrier of the wearable apparatus are in a normal state. In this embodiment, monitoring of the passenger conveying device 3100 is provided in combination with currently popular wearable apparatuses, and the pertinence and accuracy of monitoring is further provided. For example, descriptions are made by taking a mobile phone as one example of the wearable apparatus. The current mobile phone usually at least has sensors such as a gravity sensor, a position sensor and a camera, and the like. Therefore, the situation of the carrier of the mobile phone may also be acquired through the mobile phone, so as to assist in judging whether there is an abnormality.

Alternatively, the second data frame comprises a position data frame; and a current state data frame and/or acceleration data; the processing device 3220 judges whether the carrier of the wearable apparatus is located on the passenger conveying device 3100 based on the position data frame; and the processing device 3220 judges whether the carrier of the wearable apparatus is staring at the wearable apparatus based on the current state data frame; and/or the processing device 3220 judges whether a second acceleration of the carrier of the wearable apparatus exceeds a set second acceleration threshold based on the acceleration data frame. A judgment as to whether a user is staring at the device may be implemented by recognizing a face by using the camera of the device and a corresponding algorithm. This algorithm may be a Viola-Jones algorithm and is based on head attitude estimation performed based on symmetry in a detected face. When a head attitude is lower than a very small threshold, it is considered that the user is staring at the device. Various situations will be analyzed below in detail.

Alternatively, the processing device 3220 is configured to, when the carrier of the wearable apparatus is located on the passenger conveying device 3100; and when the carrier of the wearable apparatus is staring at the wearable apparatus, judge that the carrier of the wearable apparatus is in an abnormal state. As one example, it is considered that the carrier of the mobile phone possibly is playing the mobile phone on the escalator at this moment, and this is a comparatively dangerous behavior. Therefore, it is considered that the carrier is in the abnormal state.

Alternatively, the processing device 3220 is configured to, when the carrier of the wearable apparatus is located on the passenger conveying device 3100; and when the carrier of the wearable apparatus is staring at the wearable apparatus for a period exceeding a preset period, judge that the carrier of the wearable apparatus is in the abnormal state. As one example, the user experience is obviously reduced if a warning for abnormality is given when the carrier of the mobile phone just glances at the mobile phone. Therefore, a time factor and a position factor are further introduced herein, it is considered that the carrier of the mobile phone may play the mobile phone in the dangerous area on the escalator only when the carrier stares at the mobile phone for a period exceeding the preset period and is relatively far away from an entrance or an exit of the escalator 3100, and thus it is considered that the carrier is in the abnormal state. When the passenger conveying device approaches the entrance or outlet of the escalator 3100, since the possibility of occurrence of an accident increases, this time factor is correspondingly decreased.

Alternatively, the processing device 3220 is configured to, when the carrier of the wearable apparatus is located on the passenger conveying device 3100; and the second acceleration of the carrier of the wearable apparatus exceeds the set second acceleration threshold, judge whether a first acceleration of the passenger conveying device 3100 exceeds a set first acceleration threshold further in combination with the first data frame; when the first acceleration of the passenger conveying device 3100 exceeds the set first acceleration threshold, judge that the passenger conveying device 3100 is in the abnormal state; and/or when the first acceleration of the passenger conveying device 3100 does not exceed the set first acceleration threshold, judge that the carrier of the wearable apparatus is in the abnormal state. As one example, it is judged that the wearable apparatus and the carrier of the wearable apparatus are possibly in an accelerating state when the second acceleration of the wearable apparatus exceeds the set second acceleration threshold. At this time, whether the first acceleration of the passenger conveying device 3100 exceeds the set first acceleration threshold is further judged, and whether the accelerating state is originated from the wearable apparatus and the carrier of the wearable apparatus or the passenger conveying device 3100 is judged accordingly. Subsequently, whether the wearable apparatus and the carrier of the wearable apparatus are in the abnormal state is judged.

Alternatively, the receiving device 3230 is used for receiving a second data frame group from a plurality of wearable apparatuses, the second data frame group being acquired by sensing the plurality of wearable apparatuses and carriers of the plurality of wearable apparatuses through a plurality of data sensors of a plurality of wearable apparatuses; and the processing device 3220 is used for performing analysis processing on the first data frame and the second data frame group to monitor whether the running passenger conveying device 3100 and/or the carriers of the plurality of wearable apparatuses are in the normal state. Since many abnormal states cannot be recognized by solely using a single data sensor. Therefore, acquiring the second data frame group through a plurality of data sensors will assist in making a more accurate judgment.

Figure 7:
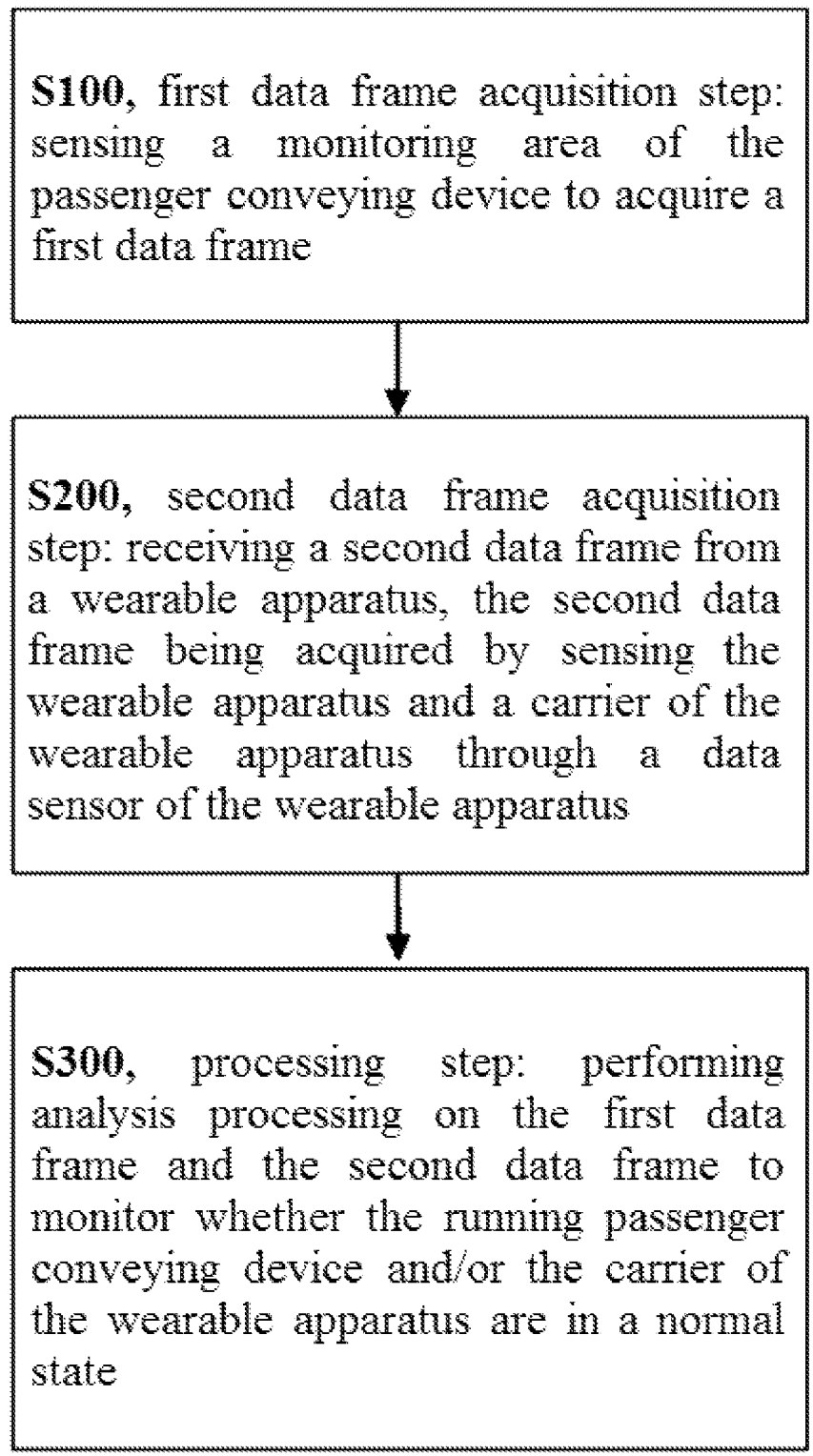
FIG. 7 is a schematic view of control steps according to another embodiment of a monitoring method for a moving handrail of a passenger conveying device provided by the present invention.

Referring to FIG. 7, in order to further improve the technical effect of the monitoring system in the above-mentioned embodiment, a monitoring method for a passenger conveying device is further provided herein, the monitoring method comprising the following steps: S100, a first data frame acquisition step: sensing a monitoring area of the passenger conveying device to acquire a first data frame; S200, a second data frame acquisition step: receiving a second data frame from a wearable apparatus, the second data frame being acquired by sensing the wearable apparatus and a carrier of the wearable apparatus through a data sensor of the wearable apparatus; and S300, a processing step: performing analysis processing on the first data frame and the second data frame to monitor whether the running passenger conveying device and/or the carrier of the wearable apparatus are in a normal state.

Alternatively, in S200, the second data frame comprises a position data frame; and a current state data frame and/or acceleration data; in S300, whether the carrier of the wearable apparatus is located on the passenger conveying device is judged based on the position data frame; and whether the carrier of the wearable apparatus is staring at the wearable apparatus is judged based on the current state data frame; and/or whether a second acceleration of the carrier of the wearable apparatus exceeds a set second acceleration threshold is judged based on the acceleration data frame.

Herein, it needs to be noted that firstly whether the carrier of the wearable apparatus is located on the passenger conveying device is judged based on the position data frame, and then it is necessary to make other judgments. Judgments based on the current state data frame and based on the acceleration data frame may be respectively made to respectively obtain concerned abnormal events, and may also be jointly made to obtain wider and more accurate judgments.

As a fact basis of the above-mentioned analysis, several judgment examples are provided below to facilitate understanding.

Alternatively, in S300, when the carrier of the wearable apparatus is located on the passenger conveying device; and when the carrier of the wearable apparatus is staring at the wearable apparatus, it is judged that the carrier of the wearable apparatus is in an abnormal state.

Alternatively, in S300, when the carrier of the wearable apparatus is located on the passenger conveying device; and when the carrier of the wearable apparatus is staring at the wearable apparatus for a period exceeding a preset period, it is judged that the carrier of the wearable apparatus is in the abnormal state.

Alternatively, in S300, when the carrier of the wearable apparatus is located on the passenger conveying device; and the second acceleration of the carrier of the wearable apparatus exceeds the set second acceleration threshold, whether a first acceleration of the passenger conveying device exceeds a set first acceleration threshold is judged further in combination with the first data frame; when the first acceleration of the passenger conveying device exceeds the set first acceleration threshold, it is judged that the passenger conveying device is in the abnormal state; and/or when the first acceleration of the passenger conveying device does not exceed the set first acceleration threshold, it is judged that the carrier of the wearable apparatus is in the abnormal state.

Alternatively, in S200, a second data frame group from a plurality of wearable apparatuses is received, the second data frame group being acquired by sensing the plurality of wearable apparatuses and carriers of the plurality of wearable apparatuses through a plurality of data sensors of a plurality of wearable apparatuses; and in S300, analysis processing is performed on the first data frame and the second data frame group to monitor whether the running passenger conveying device and/or the carriers of the plurality of wearable apparatuses are in the normal state. Since many abnormal states cannot be recognized by solely using a single data sensor. Therefore, acquiring the second data frame group through a plurality of data sensors will assist in making a more accurate judgment.

Figure 4:
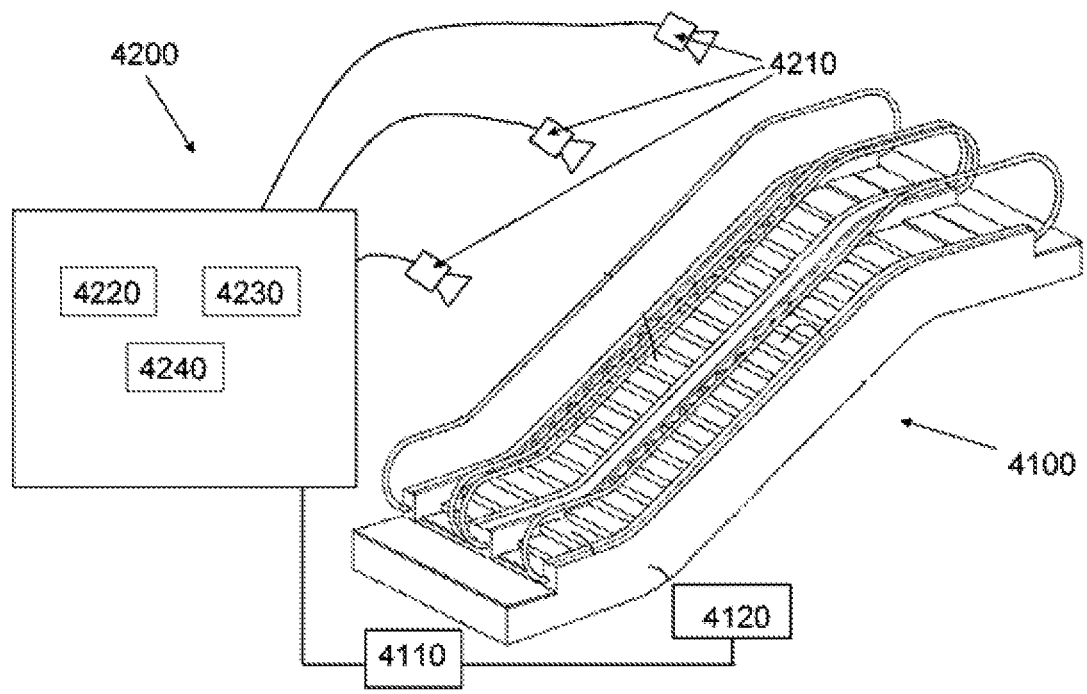
FIG. 4 is a schematic view according to another embodiment of a passenger conveying device and a monitoring system for the passenger conveying device provided by the present invention.

Referring to FIG. 4, an embodiment of another monitoring system 4200 for a passenger conveying device 4100 is further provided. The monitoring system 4200 comprises: a depth sensing sensor 4210 used for sensing a monitoring area of the passenger conveying device 4100 to acquire a first data frame; an auxiliary sensor group 4240 used for sensing the monitoring area of the passenger conveying device 4100 to acquire a second data frame group; a preprocessing device 4230 used for performing distribution processing of an occurrence probability of a specific event on data frames in the second data frame group to acquire a preprocessed second data frame group; and a processing device 4220 used for performing analysis processing on the first data frame and the preprocessed second data frame group to monitor whether a specific event occurs on the running passenger conveying device 4100. Alternatively, the auxiliary sensor group 4240 comprises an imaging sensor, an audio sensor, a pressure sensor, a gravity sensor, an accelerometer, a capacitive sensor, a brake beam sensor, etc. Usually, when more various sensors are used, the accuracy of the event judgment is naturally improved. Correspondingly, the computing processing which needs to be performed by the processing device 4220 is more. The monitoring system 4200 in this embodiment reasonably utilizes the auxiliary sensor group 4240, the distribution processing of the occurrence probability of the specific event is performed on the acquired data frames in the second data frame group, and data frames with higher probability distribution therein are picked out. Subsequently, analysis processing is performed on these preprocessed second data frame group in combination with the first data frame sensed by the depth sensing sensor 4210 itself. On one hand, various data redundancies are screened out and the analysis processing time is reduced; and on the other hand, with respect to the situation in which only the depth sensing sensor 4210 is used, the judgment accuracy is also greatly improved.

Specifically, a probability obtained in the distribution processing of the occurrence probability of the specific event for the preprocessed second data frame group is greater than a specific event occurrence probability threshold. At this time, it can be considered that the preprocessed second data frame group has a greater influence on the occurrence of the specific event and shall be taken into consideration.

Figure 8:
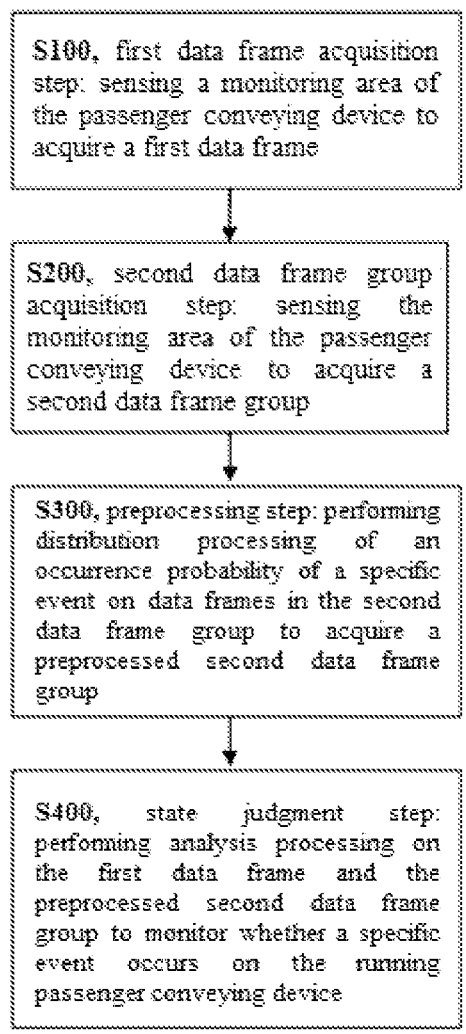
FIG. 8 is a schematic view of control steps according to another embodiment of a monitoring method for a moving handrail of a passenger conveying device provided by the present invention.

Referring to FIG. 8, correspondingly, an embodiment of a monitoring method for a passenger conveying device is further provided. The monitoring method comprises the following steps: S100, a first data frame acquisition step: sensing a monitoring area of the passenger conveying device to acquire a first data frame; S200, a second data frame group acquisition step: sensing the monitoring area of the passenger conveying device to acquire a second data frame group; S300, a preprocessing step: performing distribution processing of an occurrence probability of a specific event on data frames in the second data frame group to acquire a preprocessed second data frame group; and S400, a state judgment step: performing analysis processing on the first data frame and the preprocessed second data frame group to monitor whether a specific event occurs on the running passenger conveying device. The monitoring method in this embodiment reasonably utilizes the auxiliary sensor group, the distribution processing of the occurrence probability of the specific event is performed on the acquired data frames in the second data frame group, and data frames with higher probability distribution therein are picked out. Subsequently, analysis processing is performed on these preprocessed second data frame group in combination with the first data frame sensed by the depth sensing sensor itself. On one hand, various data redundancies are screened out and the analysis processing time is reduced; and on the other hand, with respect to the situation in which only the depth sensing sensor is used, the judgment accuracy is also greatly improved.

Alternatively, in S300, a probability obtained in the distribution processing of the occurrence probability of the specific event for the preprocessed second data frame group is greater than a specific event occurrence probability threshold. At this time, it can be considered that the preprocessed second data frame group has a greater influence on the occurrence of the specific event and shall be taken into consideration.

Besides, a passenger conveying device is further provided herein, which can respectively apply or jointly apply the monitoring systems in the above-mentioned embodiments and can be controlled by cooperatively using a corresponding monitoring method. Thereby, various potential safety hazards which possibly exist can be eliminated, and the user experience and the confidence level of the passengers with respect to the passenger conveying device are improved.

It needs to be stated that the elements (including the flowcharts and the block diagrams in the drawings) disclosed and described in this text are intended to indicate logic boundaries among elements. However, according to software or hardware engineering practices, the described elements and functions thereof may be executed on a machine through a computer-executable medium, the computer-executable medium has a processor capable of executing program instructions stored therein, the program instructions are used as single-chip software structures, independent software modules, modules using external programs, codes, services and the like, or any combination thereof, and all these execution solutions may be included in the scope of the present disclosure.

Although there are specifically described assemblies in different nonrestrictive implementation solutions, the implementation solutions of the present invention are not limited to these specific combinations. Some of assemblies or features from any nonrestrictive implementation solutions may be used and combined with features or assemblies from any other nonrestrictive implementation solutions.

Although specific step sequences are illustrated, disclosed and claimed, it should be understood that the steps may be implemented, separated or combined in any sequence and still benefit from the present disclosure, unless otherwise clearly indicated.

The above-mentioned description is exemplary instead of being defined as limited thereto. This text discloses various nonrestrictive implementation solutions. However, one skilled in the art should be aware of that, according to the above-mentioned teaching, various modifications and changes are included in the scope of the annexed claims. Therefore, it should be understood that, within the scope of the annexed claims, disclosure contents except the specific disclosure may be implemented. For this reason, the contents and the actual scope should be determined by reading up the annexed claims.

What is claimed is:

1. A monitoring system for a passenger conveying device comprising:
    an imaging sensor and/or a depth sensing sensor used for sensing a monitoring area of the passenger conveying device to acquire data frames; and
    a processing device used for performing data processing on the data frames to monitor whether the monitoring area is abnormal, wherein the processing device is configured to:
        perform a background acquisition process, wherein the background acquisition process includes acquiring a background model based on data frames sensed when the monitoring area is in a normal state;
        perform a foreground detection process, wherein the foreground detection process includes comparing data frames sensed in real time with the background model to obtain a foreground object;
        perform a foreground feature extraction process, wherein the foreground feature extraction process includes:
            defining an abnormal human body model based on human body non-self-learning modeling and/or human body self-learning modeling; and
            extracting a corresponding foreground object markup feature from the foreground object; and
        perform a state judgment process, wherein the state judgment process includes judging whether the foreground object belongs to an abnormal population at least based on the foreground object markup feature.

2. The monitoring system according to claim 1, wherein the human body self-learning modeling obtains the abnormal human body model through a deep learning technique, and the deep learning technique comprises a deep neural network, a convolutional neural network, a recursive neural network and a dictionary learning or a bag-of-visual-words model; and/or the human body non-self-learning modeling comprises a bone map model and/or a binary map model.

3. The monitoring system according to claim 1, wherein the extracted foreground object markup feature comprises one or more of a color, a size, a shape and a speed of a human body in the foreground object, and wherein the state judgment process includes judging whether the foreground object belongs to the abnormal population based on one or more of the color, the size, the shape and the speed of the human body in the foreground object.

4. The monitoring system according to claim 3, wherein foreground object is judged as belonging to the abnormal population when one or more of the color, the size, the shape and the speed of the human body in the foreground object falls into the abnormal human body model.

5. The monitoring system according to claim 1, wherein the foreground feature extraction process further includes defining an abnormal object model based on object non-self-learning modeling and/or object self-learning modeling.

6. The monitoring system according to claim 5, wherein the extracted foreground object markup feature comprises a size and/or a shape of an object in the foreground object, wherein the state judgment process includes judging whether the foreground object belongs to the abnormal population based on the size and/or the shape of the object in the foreground object.

7. The monitoring system according to claim 6, wherein the foreground object is judged as belonging to the abnormal population when the size and/or the shape of the object in the foreground object falls into the abnormal object model.

8. The monitoring system according to claim 1, wherein:

the foreground feature extraction process further includes extracting a corresponding foreground object markup feature around the abnormal population from the foreground object when the foreground object belongs to the abnormal population; and
the state judgment process further includes judging whether the foreground object is in an abnormal state at least based on the corresponding foreground object markup feature around the abnormal population.

9. The monitoring system according to claim 1, wherein the foreground feature extraction process further includes defining a pet model based on pet non-self-learning modeling and/or pet self-learning modeling.

10. The monitoring system according to claim 9, wherein the extracted foreground object markup feature comprises one or more of a shape, a profile, a size and a color of a pet in the foreground object, wherein the state judgment process includes judging whether the foreground object belongs to the abnormal population based on one or more of the shape, the profile, the size and the color of the pet in the foreground object.

11. The monitoring system according to claim 10, wherein the foreground object is judged as belonging to the abnormal population when the size and/or the shape of the pet in the foreground object falls into the pet model.

12. The monitoring system according to claim 1, wherein the processing device is further configured to:
perform a trajectory generation process, wherein the trajectory generation process includes generating a change trajectory of the foreground object markup feature according to the foreground object markup feature respectively extracted from the foreground object corresponding to a plurality of continuous data frames.

13. The monitoring system according to claim 12, the trajectory is generated by applying a Bayesian estimation technique to a vector of the foreground object markup feature.

14. The monitoring system according to claim 12, wherein the state judgement process further includes pre-judging whether the foreground object will belong to the abnormal population based on the change trajectory of the foreground object markup feature.

15. The monitoring system according to claim 1, wherein the foreground object is judged as belonging to the abnormal population when judgment results of at least two continuous data frames are that the foreground object belongs to the abnormal population.

16. The monitoring system according to claim 1, wherein the imaging sensor and/or the depth sensing sensor senses and acquires data frames within a predetermined period at an interval of a predetermined period for the processing device to perform data processing.

17. The monitoring system according to claim 1, wherein the imaging sensor and/or the depth sensing sensor comprises a plurality of imaging sensors and/or depth sensing sensors, which are disposed to be capable of covering an entrance and/or an exit and/or an entire length direction of the passenger conveying device.

18. The monitoring system according to claim 1 further comprising an alarm unit, wherein the state judgment process further includes triggering the alarm unit when the foreground object is judged as belonging to the abnormal population.

19. The monitoring system according to claim 1, wherein the processing device is further configured to trigger outputting of a signal to the passenger conveying device and/or an escalator maintenance center of a building to prevent a safety accident from occurring when the foreground object is judged as belonging to the abnormal population.

20. The monitoring system according to claim 1, wherein the background acquisition process includes performing processing on the sensed data frames to acquire the background model through a Gaussian mixture model, a codebook model, principle components analysis or robust principle components analysis.

21. The monitoring system according to claim 1, wherein the foreground detection process includes comparing the data frames sensed in real time with the background model through an inter-frame difference, morphological operators and temporal, spatial or temporal-spatial kernel convolution to obtain the foreground object.

22. The monitoring system according to claim 1, wherein the foreground feature extraction process includes extracting the corresponding foreground object markup feature from the foreground object by estimating temporal, spatial or temporal-spatial gradients and by estimating colors, depths and histograms and parameter models of any of these parameters.

23. The monitoring system according to claim 1, wherein the state judgment process includes judging whether the foreground object belongs to the abnormal population based on a distance function; or judging whether the foreground object belongs to the abnormal population by means of probability based on separate or joint Bayesian inference.

24. A monitoring method for a passenger conveying device comprising:
a data frame acquisition step comprising: sensing a monitoring area of the passenger conveying device to acquire data frames;
a background acquisition step comprising: acquiring a background model based on data frames sensed when the monitoring area is in a normal state;
a foreground detection step comprising: comparing data frames sensed in real time with the background model to obtain a foreground object;
a foreground feature extraction step comprising:
defining an abnormal human body model based on human body non-self-learning modeling and/or human body self-learning modeling; and
extracting a corresponding foreground object markup feature from the foreground object; and
a state judgment step comprising: judging whether the foreground object belongs to an abnormal population at least based on the foreground object markup feature.

* * * * *